Sept. 22, 1942.  W. J. BAKER ET AL  2,296,415
HANDLE ATTACHMENT MEANS FOR BABY WALKERS
Filed Dec. 16, 1940
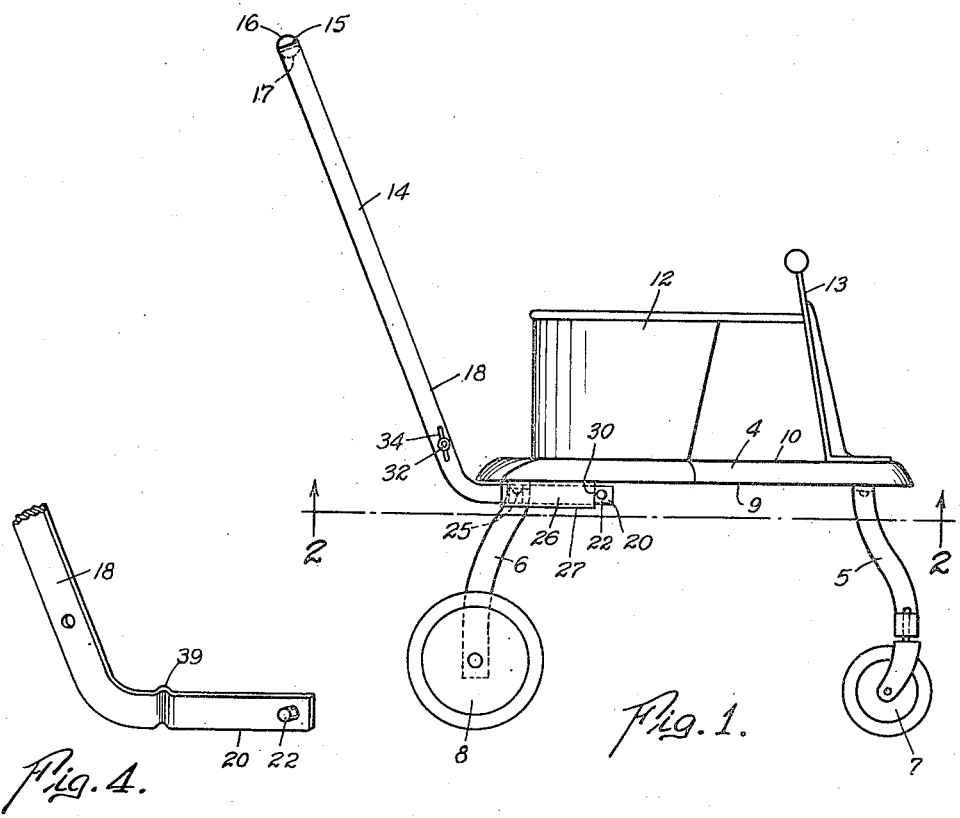
Fig. 1.
Fig. 4.
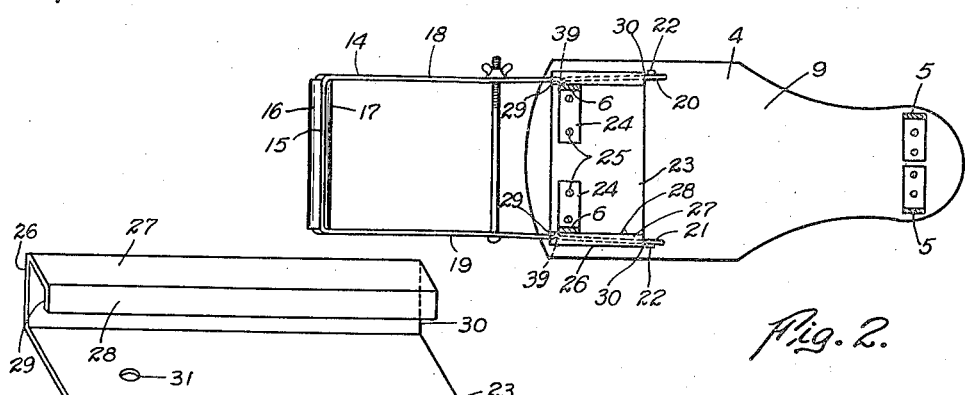
Fig. 2.
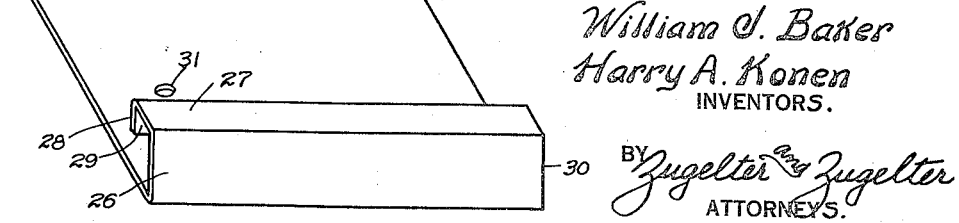
Fig. 3.
William J. Baker
Harry A. Konen
INVENTORS.
BY Zugelter and Zugelter
ATTORNEYS.

Patented Sept. 22, 1942

2,296,415

UNITED STATES PATENT OFFICE 2,296,415

HANDLE ATTACHMENT MEANS FOR BABY WALKERS

William J. Baker and Harry A. Konen, Newport, Ky., assignors to The W. J. Baker Co., Newport, Ky., a corporation of Kentucky Application December 16, 1940, Serial No. 370,230

7 Claims. (Cl. 280—47)

This invention relates to a handle attachment means for use upon children's vehicles, for example, baby walkers, and the like.

An object of the invention is to provide, in connection with vehicles of the character stated, a safe and reliable handle securing means whereby such a vehicle may be pushed along, steered, and otherwise controlled without liability of the handle becoming detached.

Another object of the invention is to provide means for the purpose stated above, which is simple and may be manipulated easily by persons not mechanically trained, and which may be manufactured and sold at low cost.

These and other objects are attained by the means described herein and disclosed in the accompanying drawing, in which:

Fig. 1 is a side elevation of a child's vehicle embodying the handle attaching means of the invention.

Fig. 2 is a bottom view taken on line 2—2 of Fig. 1.

Fig. 3 is an enlarged perspective view of a handle socket plate forming a detail of the invention.

Fig. 4 is a detail view showing in perspective the lower end, or tongue, of one of the two shafts which constitutes the handle 14.

As is well known, baby walkers and the like have been equipped heretofore with detachable handles of one type or another, and various forms of connecting means have been devised in the effort to produce a safe and reliable structure. The problem of preventing accidental detachment of the handle from the vehicle is rendered especially difficult, if the handle connection is to be quick-acting for instant application and removal, and at the same time safe and reliable. This is so because of the many different strains and stresses that the handle structure must withstand, in steering the vehicle from side to side, and in lifting and inclining the vehicle when negotiating street curbings and other obstructions. The handle connection accordingly must withstand upward, downward, and sidewise strains without liability to become accidentally detached and thereby allowing the vehicle to pass out of the control of a person guiding it by means of the handle. The present invention is directed to the problem of furnishing a handle structure which will be absolutely safe and reliable, and yet retain the advantage of quick and easy attachment and detachment relative to the vehicle.

With reference to the accompanying drawing, 4 indicates the body of the vehicle, and 5 and 6 indicate front and rear brackets for supporting the front caster wheels 7 and the rear wheels 8, respectively. The body may be in the form of a properly shaped board or panel, having an under side or face 9 and a top side or face 10. Upon the top side of the body, a suitable basket 12 and a post 13 may be mounted for supporting a child seated upon the vehicle body 4. A handle indicated generally by the character 14, is provided for enabling a grown person to guide and propel the vehicle. The handle may include a cross bar 15, which if desired, may be covered with a pair of half-round wooden hand grips 16 and 17. The presence or absence of any form of hand grips such as 16 and 17 is entirely immaterial to the present invention, and forms no part thereof.

The lower section of handle 14 may comprise a pair of spaced arms 18 and 19 each having an end thereof turned at a convenient angle to dispose the cross bar 15 at approximate waist height. The turned ends of the arms, indicated by the characters 20 and 21, are regarded as tongues spaced apart normally in substantial parallelism. The tongues as well as the arms, are resilient and flexible in the direction of their thickness so that one might grasp the terminal ends of the tongues and either spread them apart or force them together, within limits, without permanently distorting them. At the free end portions of the tongues, studs or pins 22 performing as stops or abutments are either punched from the material of the tongues or applied thereto as separate elements, like extending rivets, for example. These studs or pins extend outwardly of the handle structure, and in opposite directions, as shown by the drawing Fig. 2.

In flatwise contact against the under face of the body, is secured a handle socket plate 23, and upon the plate are fixed the ears 24 of the rear wheel bracket 6—6. Joining of these parts together may be effected by means of screws, bolts or other fastening devices 25 which penetrate the wooden body 4. Plate 23 has its opposite ends turned, as at 26, and again as at 27 and 28, to provide a pair of elongated spaced parallel socket elements for reception of the handle tongues, which enter the socket elements from the rear as illustrated by Fig. 1. As will be more fully explained later, the inner face 29 of each socket member performs as a fulcrum for a handle tongue, and the outer edges 30 which are diagonally opposed to the fulcrum edges or sides, act as latching edges for the pins or stops 22 of the tongues. The openings indicated at 31 of Fig. 3, receive the fasteners 25 which secure both the handle socket plate and the rear wheel bracket to the vehicle body.

Means are provided for laterally springing the tongues 20 and 21 outwardly away from one another while lodged within the socket elements, and said means may include a suitable contractible device such as a bolt 32 which passes through suitable apertures in the arms 18 and 19. One end of the bolt may have a head 33, while the opposite end is threaded and furnished with a thumb nut 34 or the like. When the nut is tightened, the arms 18 and 19 are advanced toward one another, thereby causing the tongues to fulcrum at 39 upon the socket elements. The resultant action is an outward movement of the free ends of the tongues 20 and 21, which carry the studs or stops 22. This outward movement places the studs or stops in position to latch upon the latching edges 30—30 of the socket elements, since the tongues in the region of the stops are necessarily forced laterally against the outer side walls 26—26 of the socket elements. By thusly tightening the contractible device 32—33—34, the handle is quickly and safely applied and will not accidentally become detached under any conditions of strain or stress resulting from guiding the vehicle by means of the handle.

To detach the handle, it is necessary only to loosen the nut 34 sufficiently to relieve the binding action at fulcrums 29—39, whereupon the resiliency of the tongues will restore them to their normal spaced parallelism and they may accordingly be withdrawn from the sockets.

It may be noted that the socket elements, at their inner walls 28—28, are by preference butted against the more substantial metal of the rear wheel brackets 6—6 (Fig. 2), so as to reinforce the socket elements and render them capable of withstanding the force applied thereto by the handle tongues at the fulcrums 29—39, even though the handle socket plate be formed of light gauge metal. Any contractible device other than the particular device 32 herein disclosed by way of example, may be employed for flexing the arms and tongues as explained. Various other modifications and changes in structural details may be effected, within the scope of the appended claims, without departing from the spirit of the invention.

What is claimed is:

1. The combination with a tractional vehicle body having an under side and a top side, of means for guiding said vehicle, said guiding means comprising a handle having a pair of spaced arms, an angularly disposed tongue on the end of each arm, and a stop adjacent to the free end of each tongue, a pair of elongated socket elements fixed in spaced substantial parallelism to the vehicle body lengthwise thereof, a fulcrum and a latching edge diagonally opposed upon each socket element, and means operative manually to spring the arms of the handle laterally, and to maintain said arms in the sprung condition with the tongues abutting the fulcrums and the stops engaging the latching edges of the socket elements.

2. The combination with a tractional vehicle body having an under side and a top side, of means for guiding said vehicle, said guiding means comprising a handle having a pair of spaced arms, an angularly disposed tongue on the end of each arm, and a stop adjacent to the free end of each tongue, a pair of elongated socket elements fixed in spaced substantial parallelism to the vehicle body lengthwise thereof, a fulcrum and a latching edge diagonally opposed upon each socket element, and contractible screw threaded bolt means operative manually to spring the arms of the handle laterally, and to maintain said arms in the sprung condition with the tongues abutting the fulcrums and the stops engaging the latching edges of the socket elements.

3. The combination with a tractional vehicle body having an under side and a top side, of means for guiding said vehicle, said guiding means comprising a handle having a pair of flexible arms, an angularly disposed tongue on the end of each arm, and a laterally extending stop adjacent to the free end of each tongue, a pair of elongated socket elements fixed in spaced substantial parallelism to the vehicle body lengthwise thereof, said socket elements each having a pair of vertical walls spaced apart a distance sufficient to enable free advancement of a tongue and its extending stop lengthwise through the socket element and between the spaced walls thereof, said spaced walls being of an effective length such that substantial advancement of a tongue lengthwise through the socket element disposes the laterally extending stop of the tongue beyond an end edge of one of said walls, and means for flexing the tongues so advanced, to force one side of each tongue into bearing contact with one wall of a socket element, and the opposite side of each tongue into bearing contact with the opposed wall of the same socket element, thereby to laterally displace each laterally extending stop behind and in alignment with an end edge of a socket wall, to preclude withdrawal of the tongues so long as the tongues are influenced by the flexing means aforesaid.

4. The combination with a vehicle body of the class described, having an under side and a top side, and a rear wheel bracket substantially spanning the body from side to side, of a handle socket plate also substantially spanning the body, said plate resting upon the under side of the body in flatwise contact, fastening means passing through the wheel bracket and the plate, and into the material of the vehicle body, for fixing the bracket to the plate and the plate to the body as a unit, the said plate having opposite ends turned at right angles away from the plate in a common direction, and bent inwardly and then toward the plane of the plate, to provide opposed spaced parallel socket elements each having a fulcrum side and a latching edge diagonally opposed, the rear wheel bracket having portions abutting and laterally reinforcing the fulcrum sides of the socket elements, a guiding handle including a pair of flexible spaced arms with an end of each arm bent angularly to form a tongue for entry into a socket element of the plate, an extending stud projecting outwardly from each tongue, and in opposite directions, said studs being foreshortened so as to readily pass through the socket elements when the tongues are inserted therein, to a location beyond the latching edges of the socket elements, and means operative to contract the handle arms laterally toward one another while the tongues are located within the socket elements, for forcing the tongues laterally against the fulcrum sides of the socket elements and thereby spreading the terminal ends of the tongues apart, to maintain a latched position of the projecting studs behind the latching edges of the socket members.

5. The combination with a vehicle body of the class described, having an under side and a top side, and a rear wheel bracket substantially spanning the body from side to side, of a handle socket plate also substantially spanning the body, said plate resting upon the under side of the body in flatwise contact, fastening means passing through the wheel bracket and the plate, and into the material of the vehicle body, for fixing the bracket to the plate and the plate to the body as a unit, the said plate having opposite ends turned at right angles away from the plate in a common direction, and bent inwardly and then toward the plane of the plate, to provide opposed spaced parallel socket elements each having a fulcrum side and a latching edge diagonally opposed, the rear wheel bracket having portions abutting and laterally reinforcing the fulcrum sides of the socket elements, a forked guiding handle including a pair of flexible divergent arms with an end of each arm bent angularly to form a tongue for entry into a socket element of the plate, an extending stud projecting outwardly from each tongue, and in opposite directions, said studs being foreshortened so as to readily pass through the socket elements when the tongues are inserted therein, to a location beyond the latching edges of the socket elements, and a bolt having a threaded end and a thumb nut thereon, spanning the spaced arms of the handle and adapted, upon tightening the nut, to force the arms toward one another, thereby to move the tongues of the arms into forceful contact with the socket fulcrums, resulting in spreading apart the terminal ends of said tongues and disposing the extending studs of the tongues to latching position with respect to the latching edges of the socket elements.

6. The combination with a tractional vehicle body, of means for guiding said vehicle, said guiding means comprising a handle including a pair of spaced arms, a laterally flexible tongue on the end of each arm, and a stop on each tongue, a pair of elongated socket elements fixed in spaced relationship upon the vehicle body lengthwise thereof, said socket elements each including a pair of opposed lateral walls against which the tongues may be flexed, and means remote from the socket elements, for flexing the handle tongues laterally and with a degree of divergency sufficient to cramp the tongues diagonally into contact with opposite end portions of both lateral walls of the socket elements, with the tongue stops in locking engagement with the socket elements to preclude withdrawal of the tongues therefrom.

7. The combination with a tractional vehicle body having an under side and a top side, of means for guiding said vehicle, said guiding means comprising a handle having a pair of flexible arms, an angularly disposed tongue on the end of each arm, and a laterally extending stop adjacent to the free end of each tongue, a pair of elongated socket elements fixed in spaced substantial parallelism to the vehicle body lengthwise thereof, said socket elements each having a pair of vertical walls spaced apart a distance sufficient to enable free advancement of a tongue and its extending stop lengthwise through the socket element and between the spaced walls thereof, said spaced walls being of an effective length such that substantial advancement of a tongue lengthwise through the socket element disposes the laterally extending stop of the tongue beyond an end edge of one of said walls, and strain developing means on the arms of the guiding means disposed at a distance from the tongues and socket elements, for flexing the tongues when advanced as stated, to force one side of each tongue into bearing contact with one wall of a socket element, and the opposite side of each tongue into bearing contact with the opposed wall of the same socket element, thereby to laterally displace each laterally extending stop behind and in alignment with an end edge of a socket wall, to preclude withdrawal of the tongues so long as the tongues are influenced by the strain developing means aforesaid.

WILLIAM J. BAKER.
HARRY A. KONEN.